United States Patent [19]
Masumoto et al.

[11] Patent Number: 5,813,939
[45] Date of Patent: Sep. 29, 1998

[54] VEHICLE DRIVE SYSTEM INCLUDING A TORQUE SPLITTER

[75] Inventors: Hiroshi Masumoto; Sunao Ishihara; Shinji Ohkuma, all of Wako, Japan

[73] Assignee: Honda Giken Kogyo Kabushiki Kaisha, Tokyo, Japan

[21] Appl. No.: 828,980

[22] Filed: Mar. 31, 1997

[30] Foreign Application Priority Data

May 23, 1996 [JP] Japan ................................. 8-151514

[51] Int. Cl.⁶ .................................................. B60K 17/00
[52] U.S. Cl. ............................................. 477/35; 477/107
[58] Field of Search ...................................... 477/35, 107

[56] References Cited

U.S. PATENT DOCUMENTS 5,405,302  4/1995  Yagi et al. .............................. 477/107

FOREIGN PATENT DOCUMENTS 8-21492  1/1996  Japan .

Primary Examiner—Dirk Wright
Attorney, Agent, or Firm—Skjerven Morrill MacPherson Franklin & Friel LLP; Thomas S. MacDonald

[57] ABSTRACT

In a vehicle drive system having a torque split arrangement, it is difficult to have all the rotating parts of the system to be properly balanced. In particular, when a rotational speed difference is produced between the two output elements, relatively massive parts which may not be properly balanced may have to be turned at a high speed. According to the present invention, because the power output of the engine is reduced whenever any significant speed difference is produced between the two output elements, no part of the drive system is subjected to any excessive rotational speed, and are therefore not required to have any excessive mechanical strength. This improves the reliability of the system, and reduces the manufacturing cost.

7 Claims, 7 Drawing Sheets

VEHICLE DRIVE SYSTEM INCLUDING A TORQUE SPLITTER

TECHNICAL FIELD

The present invention relates to a vehicle drive system, and in particular to a vehicle drive system with a torque split arrangement for increasing the speed of one of the driven wheels which encounters less resistance than the other driven wheel.

BACKGROUND OF THE INVENTION

The power train of a vehicle normally includes a differential device to accommodate a difference between the rotational speeds of the right and left wheels due to the difference in the turning radii of the right and left wheels. A normal differential device merely passively accommodates a difference in rotational speed of the right and left wheels according to the rolling resistance of the right and left wheels, and cannot positively influence the cornering powers of the wheels, the steering response of the vehicle or other dynamic properties of the vehicle.

Japanese patent application No. 6-153324 discloses a traction split system which is disposed in parallel with a conventional differential device and which can increase the rotational speed of one of the wheels associated with a lower rolling resistance by controlling the rolling resistance acting upon each of the wheels. This system can actively change the split ratio of the overall traction to the right and left wheels according to the steering angle and the vehicle speed.

However, according to this traction split system, when the difference in rotational speed between the right and left wheels becomes excessive, part of the power train having a speed increasing function may start turning at an extremely high speed. Such a large difference in rotational speed between the right and left wheels can occur when any imbalance in the frictional conditions of the right and left wheels develops, for instance when one of the right and left wheels goes over a pool of water or other slippery road surface area. Such an occurrence may be rare, but the components of the power train must be designed so as to withstand such rare occurrences, and this leads to an increase in the manufacturing cost of the vehicle power train.

BRIEF SUMMARY OF THE INVENTION

In view of such problems of the prior art, a primary object of the present invention is to provide a vehicle drive system having a torque split arrangement which is not required to have any excessive mechanical strength, and is therefore economical to manufacture.

A second object of the present invention is to provide a vehicle drive system having a torque split arrangement which cancels its torque split operation whenever any undue imbalance in loading of the two output elements develops, and can thereby prevent the component parts of the power train from turning at an excessive rotational speed.

A third object of the present invention is to provide a vehicle drive system having a torque split arrangement which is reliable in operation.

According to the present invention, these and other objects can be accomplished by providing a vehicle drive system including a torque splitter for distributing an output of a vehicle engine to a pair of output shafts, comprising: a differential gear device including an input element and a pair of output elements; engaging means for selectively engaging one of said output elements with a component of said differential gear device so as to increase or decrease a rotational speed of one of said output elements over the other output element; detecting means for detecting a difference in rotational speed between said two output elements; power control means for controlling a power output of said vehicle engine; and a control unit which reduces a power output of said vehicle engine when said detected rotational speed difference is greater than a prescribed threshold level.

In a vehicle drive system having a torque split arrangement, it is difficult to have all the rotating parts of the system to be properly balanced. In particular, when a rotational speed difference is produced between the two output elements, relatively massive parts which may not be properly balanced may have to be turned at a high speed. According to the present invention, because the power output of the engine is reduced whenever any significant speed difference is produced between the two output elements, no part of the drive system is subjected to any excessive rotational speed, and are therefore not required to have any excessive mechanical strength. This improves the reliability of the system, and reduces the manufacturing cost.

However, when the rotational speed of the engine is low, any reduction in the power output of the engine may lead to stalling or other undesirable state of the engine. It is preferable to prohibit said control unit from reducing said power output of said vehicle engine when a rotational speed of said vehicle engine is below a prescribed level.

According to a preferred embodiment of the present invention, said differential device includes a sun gear coupled to one of said output elements, a planetary carrier which is coaxially rotatable relative to said sun gear, and coupled to the other output element, a planetary pinion which is rotatably carried by said planetary carrier and meshes with said sun gear, and a ring gear which is coaxially rotatable relative to said sun gear and meshes with said planetary pinion, said ring gear being adapted to be rotated by said input element. In this case, the engaging means may be adapted to couple said one output element with said other output element so as to force a prescribed rotational speed ratio between said two output elements.

The torque split arrangement of the present invention may be applied to a differential device for distributing torque to right and left wheels. In this case, said planetary pinion preferably includes a pair of pinions which mesh in series with said ring gear and said sun gear so as to achieve a desired relation between the rotational directions of the two output elements. The present invention may also be applied to a differential device for distributing an engine output to front and rear wheels of the vehicle. Typically, said engaging means comprises a frictional clutch, and for finely controlling the torque distribution, said control unit may be adapted to place said frictional clutch in a partially engaged state. The present invention may also be applied to a differential device for distributing an engine output to front and rear wheels of a vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
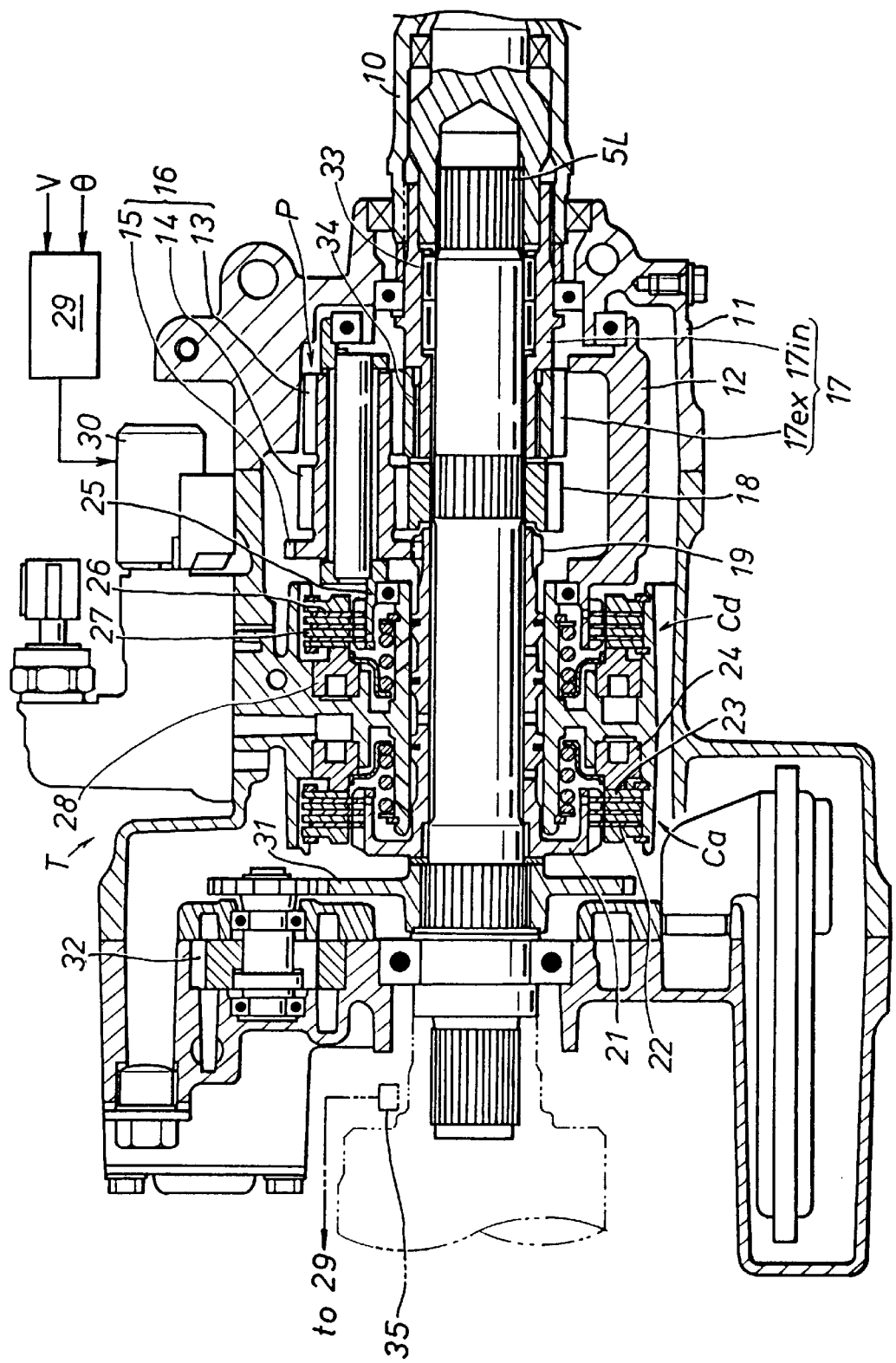
FIG. 1 is a sectional view of a torque splitter according to the present invention.
Figure 2:
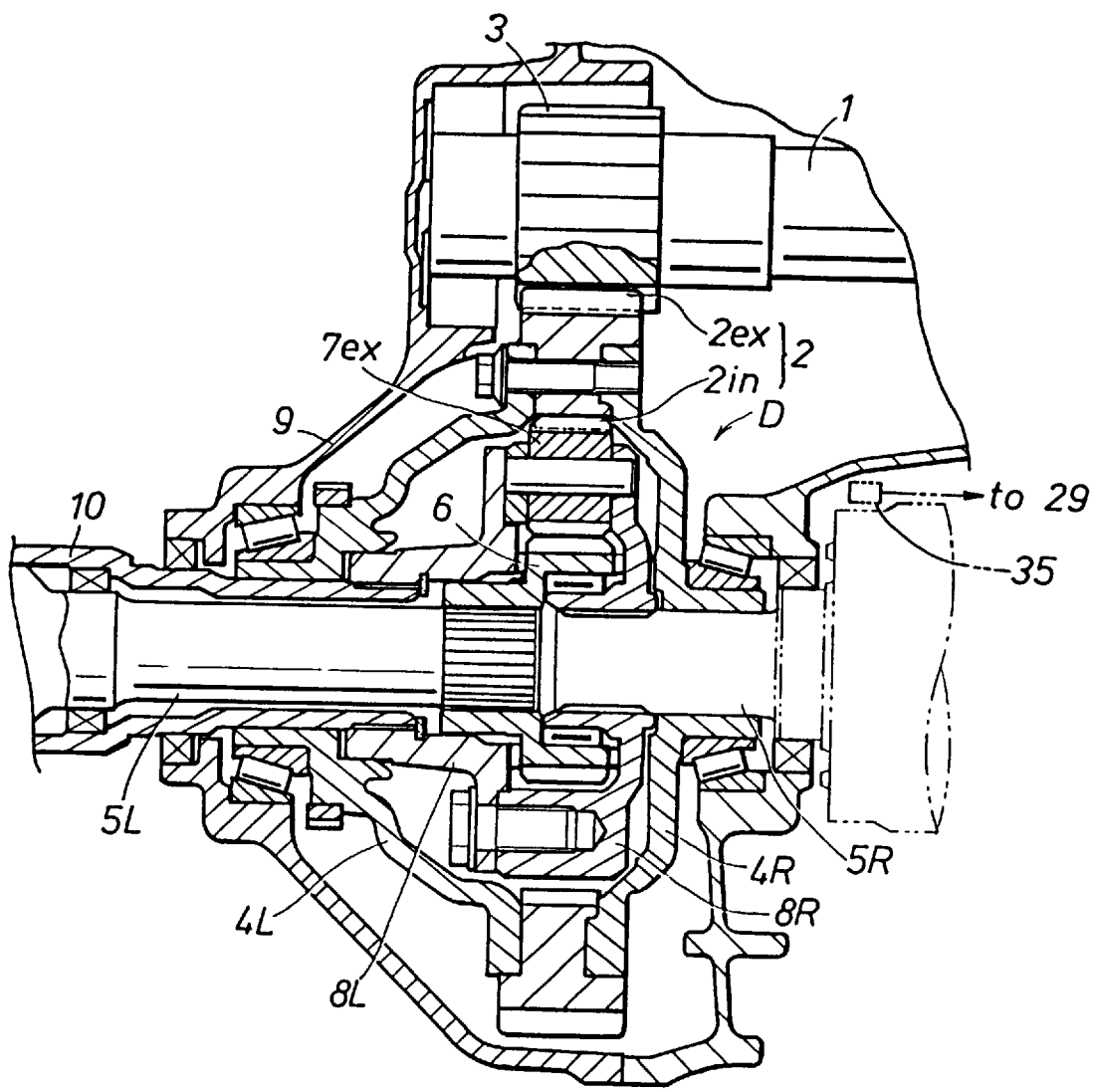
FIG. 2 is a sectional view of a differential device attached to the torque splitter of FIG. 1.
Figure 3:
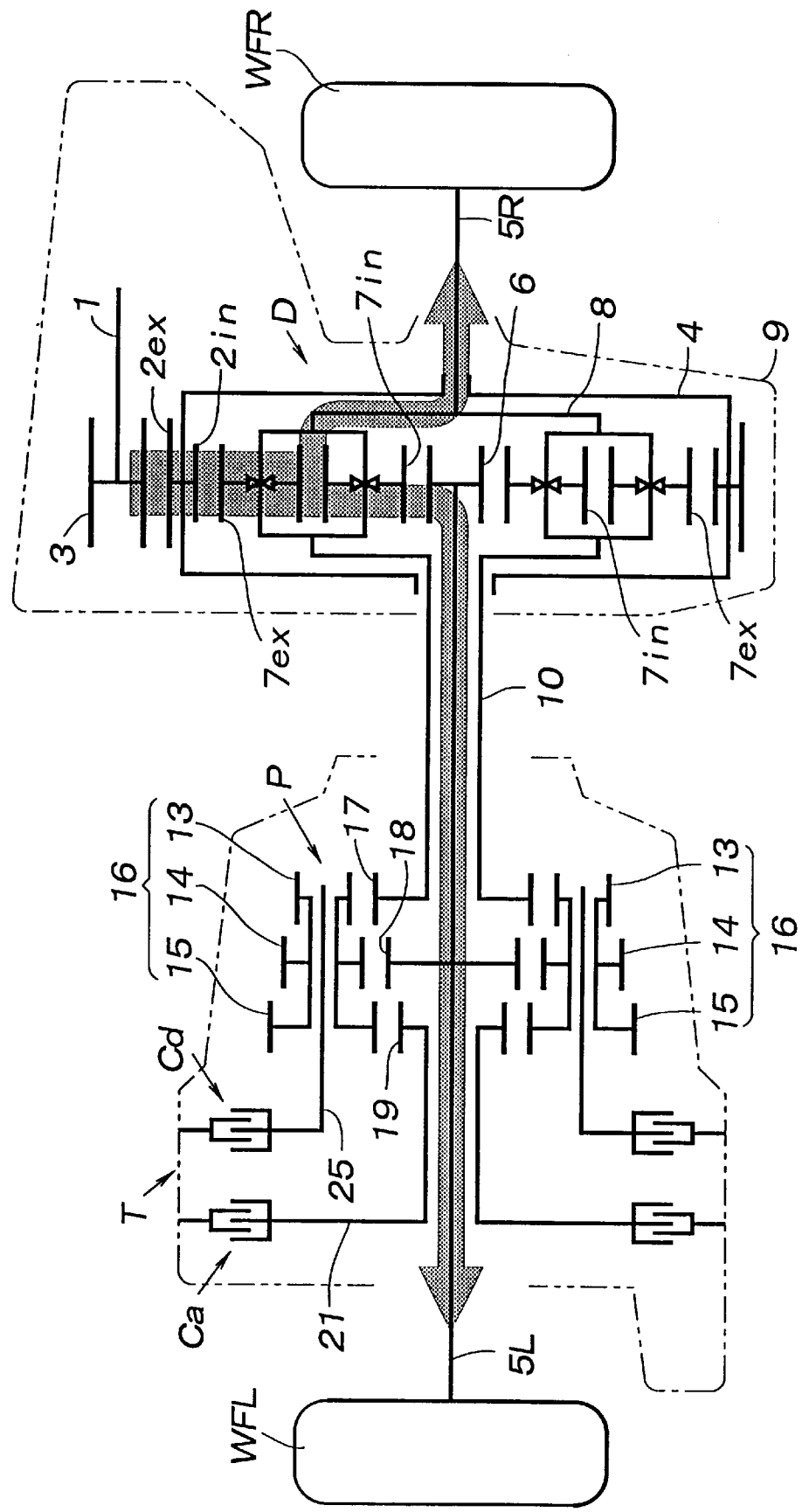
FIG. 3 is a skeleton diagram of a vehicle power train when the vehicle is traveling straight ahead.

FIG. 1 shows the structure of a torque splitter to which the present invention is applied. This torque splitter T is coupled to an output shaft 1 of a transmission via a differential device D which is shown in more detail in FIG. 2. FIG. 3 shows the skeleton diagram of the gear train. The output power of an engine (which is not shown in the drawings) is supplied to an input end of the transmission.

The differential device D consists of a double pinion type planetary gear device, and comprises a differential case 4 which includes right and left halves 4L and 4R, and a ring member 2 interposed between the right and left differential case halves 4L and 4R. The ring member 2 is formed with an external gear 2ex and an internal gear 2in. The differential case 4 is rotatably supported by a transmission housing 9. The external gear 2ex meshes with an output gear 3 formed in an end portion of the output shaft 1 of the transmission. A sleeve member 10 is rotatably passed from a left end of the transmission housing 9, and into the differential case 4. A left output shaft 5L is rotatably passed inside the sleeve 10, and an innermost end thereof is spline coupled to a sun gear 6. A right output shaft 5R is rotatably passed through the transmission housing 9, and into the differential case 4.

A planetary carrier 8 comprising a left half 8L and a right half 8R is received inside the differential case 4 in a coaxial relationship. The right and left planetary carrier halves 8L and 8R are fixedly secured to each other by threaded bolts, and rotatably supports two sets of pinions 7ex and 7in along two concentric circles (See FIG. 3. The inner pinions 7in are hidden in FIG. 1.). The left planetary carrier half 8L is spline coupled to an inner end of the sleeve 10, and the right planetary carrier half 8R is spline coupled to the right output shaft SR. The outer pinions 7ex mesh with both the internal gear 2in of the differential case 4 and the associated inner pinions 7in. The inner pinions 7in also mesh with the sun gear 6. The sun gear 6 defines a hollow center, and is rotatably supported by an annular extension of the right planetary carrier half 8L via a needle bearing.

In this differential device D, the differential case 4, in particular the ring member 2 functions as an input element. The sun gear 6 serving as one of the output elements is coupled to the left front wheel $W_{FL}$ via the left output shaft 5L while the right planetary carrier 8R serving as the other output element is coupled to the right front wheel $W_{FR}$ via the right output shaft 5R. A drive shaft equipped with synchronous couplings is interposed between the left output shaft 5L and the left front wheel $W_{FL}$ and between the right output shaft 5R and the right front wheel $W_{FR}$.

The left output shaft 5L consists of two parts which are spline coupled with each other as best shown in FIG. 1. The right end portion of the left output shaft 5L is rotatably supported by the right planetary carrier 8R via the sun gear 6 as mentioned before while the left end portion of the left output shaft 5L is rotatably supported by a casing 11 of the torque splitter T, for instance, via a ball bearing 20.

The torque splitter T comprises a planetary gear device P, a speed increase clutch Ca consisting of a hydraulically actuated multi-plate wet clutch, and a similar speed reduction clutch Cd.

The planetary gear device P of the torque splitter T comprises a planetary carrier 12 which surrounds a part of the left output shaft 5L and rotatably supported by the casing 11, a plurality of, for instance four, triple pinion members 16 which are rotatably carried by the planetary carrier 12 along a circle centered around the center of the planetary carrier 12 at a regular angular interval and each integrally combine a first pinion 13, a second pinion 14, and a third pinion 15, a first sun gear 17 which is rotatably supported on the outer circumference of the left output shaft 5L and meshes with the first pinion 13, a second sun gear 18 which is spline coupled to the outer circumference of the left output shaft 5L and meshes with the second pinion 14, and a third sun gear 19 which is integral with an inner plate retaining member 21 of the speed increase clutch Ca rotatably supported on the outer circumference of the left output shaft 5L.

The first sun gear 17 is spline coupled to a left end portion of the sleeve 10 which is spline coupled to the left planetary carrier 8L of the differential device D, and is therefore rotatable fast to the planetary carriers 8L and 8R of the differential device D and the right output shaft 5R.

The speed increase clutch Ca includes inner clutch plates 22 which are axially slidably engaged by an inner plate retaining member 21 rotatably fitted on the left output shaft 5L, outer clutch plates 23 which are axially slidably engaged by the inner surface of the casing 11, and an annular hydraulic piston 24 which is received in an annular cylinder defined in the casing 11 and is adapted to press the inner and outer clutch plates 22 and 23 to each other. As a result, the rotation of the third sun gear 19 which is integral with the inner plate retaining member 21 can be selectively prohibited.

The speed decrease clutch Cd includes inner clutch plates 26 which are axially slidably engaged by the inner plate retaining member 25 integrally extending from the planetary carrier 12, outer clutch plates 27 which are axially slidably engaged by the inner surface of the casing 11, and an annular hydraulic pinion 28 which is received in an annular cylinder defined in the casing 11 and is adapted to press the inner and outer clutch 26 and 27 plates to each other. As a result, the rotation of the planetary carrier 12 can be selectively prohibited so that the rotation of the triple pinions pivotally supported by the planetary carrier 12 may be prohibited.

The speed increase clutch Ca and the speed reduction clutch Cd are controlled by the hydraulic pressure which is produced by a gear pump 32 driven by a spur gear 31 and supplied to the clutches Ca and Cd via a hydraulic circuit. The spur gear 31 is spline coupled to the left output shaft 5L, and the hydraulic circuit includes a solenoid valve 30 which is controlled by an electronic control unit 29 receiving data such as the vehicle speed V and the steering angle θ.

The first sun gear 17 consists of an inner member 17in which is rotatably supported on the left output shaft 5L via a pair of needle bearings 33, and an outer member 17ex having teeth adapted to mesh with the first pinion 13, and these two members 17in and 17ex are spline coupled with each other. Thereby, the inner member 17in is secured to the left output shaft SL without any play, but the outer member 17ex can radially move by a distance permitted by the play in the spline coupling between the inner and outer members 17in and 17ex so that a lateral load produced by the meshing of the first pinions 13 can be favorably accommodated without creating any excessive stress.

The mode of operation of this embodiment is described in the following with reference to FIGS. 3 to 5. When the vehicle is traveling straight ahead, the speed increase clutch Ca and the speed decrease clutch Cd are both disengaged. The planetary carrier 12 and the third sun gear 19 are both set free so that the left output shaft 5L, the right output shaft 5R, the planetary carrier 8 of the differential device D, and the planetary carrier 12 of the torque splitter T all jointly rotate in a body. As indicated by the shaded arrows in FIG. 3, the torque output from the engine is evenly distributed from the differential device D to the right and left front wheels $W_{FL}$ and $W_{FR}$.

Figure 4:
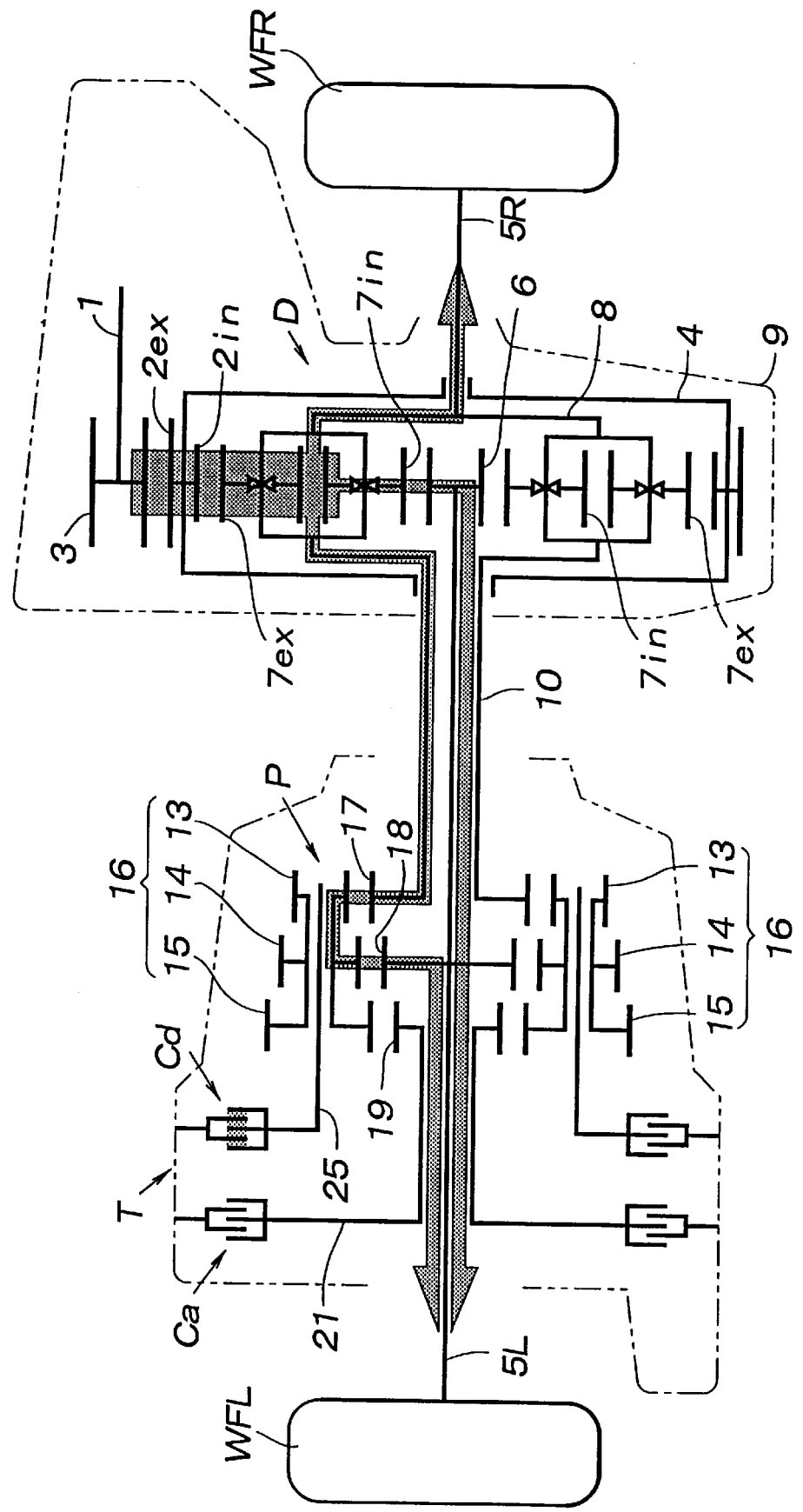
FIG. 4 is the same skeleton diagram when the vehicle is making a right turn.

When the vehicle makes a right turn, the speed reduction clutch Cd is engaged as shown in FIG. 4 so that the planetary carrier 12 is engaged with the casing 11, and is thus kept stationary. Because the left output shaft 5L associated with the left front wheel $W_{FL}$ and the right output shaft 5R associated with the right front wheel $W_{FR}$ (in other words, the planetary carrier 8 of the differential device D) are coupled to each other via the meshing between the second sun gear 18 and the second sun gear 14, and the meshing between the first pinion 13 and the first sun gear 17, the rotational speed $N_L$ of the left front wheel $W_{FL}$ is increased over the rotational speed $N_R$ of the right front wheel $W_{FR}$ as given by the following equation.

$$N_L/N_R = (Z_4/Z_3)(Z_1/Z_2) \quad (1)$$

where $Z_1$: the number of teeth of the first sun gear 17

$Z_2$: the number of teeth of the first pinion 13

$Z_3$: the number of teeth of the second sun gear 18

$Z_4$: the number of teeth of the second pinion 14

When the rotational speed $N_L$ of the left front wheel $W_{FL}$ is increased over the rotational speed $N_R$ of the right front wheel $W_{FR}$, part of the torque of the inner wheel or the right front wheel $W_{FR}$ distributed from the differential device D is transmitted to the outer wheel or the left front wheel $W_{FL}$. It is also possible to suitably reduce the rotational speed of the planetary carrier 12 of the torque splitter T by partially engaging the speed reduction clutch Cd, instead of completely stopping the planetary carrier 12, so that the rotational speed $N_L$ of the left front wheel $W_{FL}$ may be increased to a suitable extent over the rotational speed $N_R$ of the right front wheel $W_{FR}$, and the magnitude of torque transmission from the inner wheel or the right front wheel $W_{FR}$ to the outer wheel or the left front wheel $W_{FL}$ may be adjusted at will.

Figure 5:
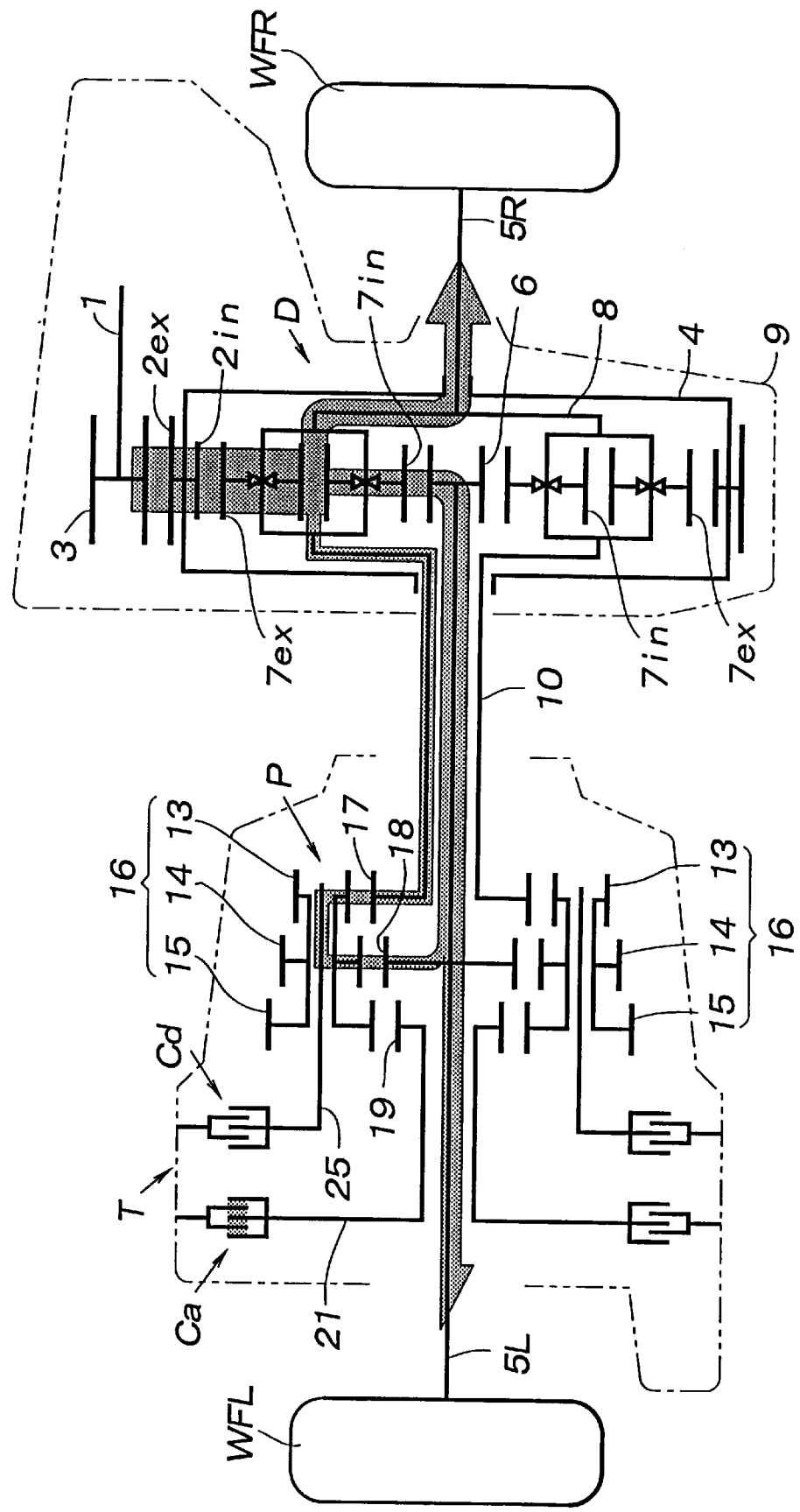
FIG. 5 is the same skeleton diagram when the vehicle is making a left turn.

When the vehicle makes a left turn, the speed increase clutch Ca is engaged as shown in FIG. 5 so that the third sun gear 19, which is integral with the inner plate retaining member 21 of the speed increase clutch Ca, is held stationary. As a result, the triple pinion 16 rotates around the axial center of the torque splitter T by virtue of the meshing between the third sun gear 19 and the third pinion 15, and the rotational speed of the planetary carrier 12 is increased over the rotational speed of the left output shaft 5L. Therefore, the rotational speed $N_R$ of the right front wheel $W_{FR}$ is increased over the rotational speed $N_L$ of the left front wheel $W_{FL}$ according to the following relationship.

$$N_L/N_R = \{1-(Z_5/Z_6)(Z_2/Z_1)\}/\{1-(Z_5/Z_6)(Z_4/Z_3)\} \quad (2)$$

where $Z_5$: the number of teeth of the third sun gear 19

$Z_6$: the number of teeth of the third pinion 15

In this manner, when the rotational speed $N_R$ of the right front wheel $W_{FR}$ is increased over the rotational speed $N_L$ of the left front wheel $W_{FL}$, as indicated by the shaded arrows in FIG. 5, part of the torque of the inner wheel or the left front wheel $W_{FR}$ distributed from the differential device D is transmitted to the outer wheel or the right front wheel $W_{FR}$. In this case also, by suitably adjusting the degree of engagement of the speed increase clutch Ca, instead of securely holding the inner plate retaining member 21 of the speed increase clutch Ca, the magnitude of torque transmission from the inner wheel or the left front wheel $_{FR}$ to the outer wheel or the right front wheel $W_{FR}$ may be adjusted at will.

It is thus possible, by suitably selecting the numbers of teeth of the pinions 13 to 15 and the sun gears 17 to 19 so as to achieve desired ratios of speed increase or decrease, and adjusting the degree of engagement of the speed reduction clutch Cd or the speed increase clutch Ca, to control the ratio of torque distribution between the right and left front wheels $W_{FR}$ and $W_{FL}$ at will. In other words, it is possible to improve the turning capability of the vehicle by transmitting a comparatively larger torque to the outer wheel than to the inner wheel in a low to medium speed range, and to improve the traveling stability of the vehicle by reducing the torque transmitted to the outer wheel in a high speed range.

When a sharp difference arises in the frictional coefficient of the road surface or other road condition between the right and left wheels, the difference in rotational speed between the right and let output shafts 5L and 5R may become excessively large, and this increase may be so large that part of the torque splitter T responsible for the speed increasing or decreasing function may be subjected to an excessive load. This requires a corresponding mechanical strength to be given to this part, and may cause an increase in the manufacturing cost of the torque splitter. It is conceivable to disengage the clutch when the difference in rotational speed between the right and let output shafts 5L and 5R is excessively large, but this is not desirable because the turning behavior of the vehicle may undergo a sharp change when the clutch is disengaged.

Figure 6:
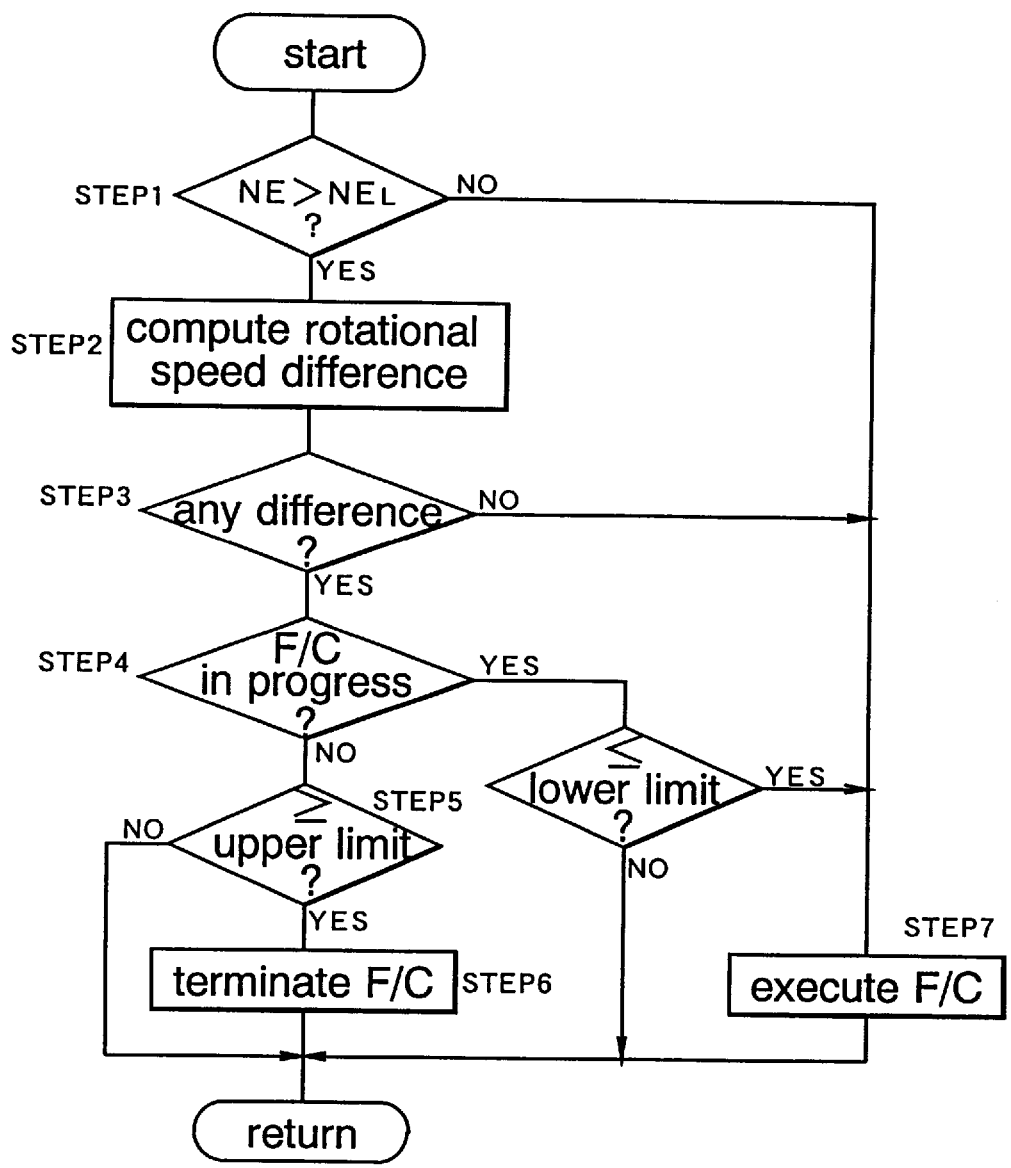
FIG. 6 is a flow chart showing the control flow of the present invention.

Therefore, according to the present invention, when the difference in rotational speed between the right and let output shafts 5L and 5R has exceeded a certain threshold level, the engine output is reduced so that the total level of the torque which is transmitted to the right and left output shafts 5R and 5L may be reduced. FIG. 6 shows a control flow which actually carries out such a control action.

First of all, it is determined if the rotational speed NE of the engine is equal to or larger than a threshold level $NE_L$ (step 1). When the rotational speed NE of the engine is larger than a threshold level $NE_L$, the rotational speeds of the right and left output shafts 5R and 5L are individually detected by suitable speed sensors 35 (FIGS. 1 and 2), and the difference between them is computed (step 2). It is determined if there is any difference in rotational speed from the result of this computation (step 3), and if there is any difference in rotational speed, it is determined if a fuel-cut (F/C) process is being executed or not (step 4). If no F/C processing is being executed, it is determined if the difference in rotational speed is greater than a certain threshold level (upper limit) or not (step 5). If the difference in rotational speed has reached this threshold level, the F/C process is executed (step 6).

On the other hand, when it is determined in step 1 that the rotational speed NE of the engine is less than the threshold level $NE_L$, the F/C process based on the detection of the difference in rotational speed is terminated (step 7). This is because when the engine speed is low, it is more necessary to maintain a certain A/F (air to fuel) mixture ratio so that the engine would not stall or otherwise fail to operate properly than to continue the operation of the torque splitter according to the present invention. Also when no difference in rotational speed is detected in step 3, the F/C process is terminated, and the normal control process is maintained.

Figure 7:
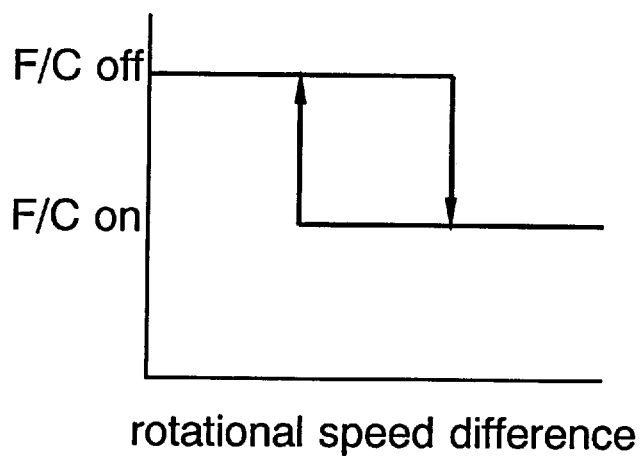
FIG. 7 is a diagram showing a engine output control action involving hysteresis.

When an execution of a F/C process is detected in step 4, it is determined in step 8 if the difference in rotational speed is below a certain threshold level (lower limit) or not. If the difference in rotational speed falls below this lower limit, the F/C process is terminated. Otherwise, the F/C process is continued. Thus, a certain hysteresis is provided between the speed difference at which the F/C process is started and the speed difference at which the F/C process is terminated (see FIG. 7). In this embodiment, the control of the engine output was effected by the F/C process, but the same goal may be achieved by changing the amount of fuel supply in different ways either by controlling fuel injection valves or a throttle valve.

Thus, according to the present invention, whenever a large difference in rotational speed develops between the right and left output shafts, the engine output is controlled so that no part of the power train may rotate at an excessive speed. Therefore, the input torque to the driven wheels and the drive shafts, as well as the input torque to the planetary gear device may be favorably controlled. Therefore, the related parts are not required to have any excessive mechanical strength, and the manufacturing cost of the power train can be avoided from becoming excessive.

Although the present invention has been described in terms of specific embodiments thereof, it is possible to modify and alter details thereof without departing from the spirit of the present invention.

What we claim is:

1. A vehicle drive system including a torque splitter for distributing an output of a vehicle engine to a pair of output shafts, comprising:

a differential gear device including an input element and a pair of output elements;

engaging means for selectively engaging one of said output elements with a component of said differential gear device so as to increase or decrease a rotational speed of one of said output elements over the other output element;

detecting means for detecting a difference in rotational speed between said two output elements;

power control means for controlling a power output of said vehicle engine; and a control unit which reduces a power output of said vehicle engine when said detected rotational speed difference is greater than a prescribed threshold level.

2. A vehicle drive system according to claim 1, wherein said control unit is prohibited from reducing said power output of said vehicle engine when a rotational speed of said vehicle engine is below a prescribed level.

3. A vehicle drive system according to claim 1, wherein said differential device includes a sun gear coupled to one of said output elements, a planetary carrier which is coaxially rotatable relative to said sun gear, and coupled to the other output element, a planetary pinion which is rotatably carried by said planetary carrier and meshes with said sun gear, and a ring gear which is coaxially rotatable relative to said sun gear and meshes with said planetary pinion, said ring gear being adapted to be rotated by said input element.

4. A vehicle drive system according to claim 3, wherein said planetary pinion includes a pair of pinions which meshes in series with said ring gear and said sun gear.

5. A vehicle drive system according to claim 1, wherein said engaging means couples said one output element with said other output element so as to force a prescribed rotational speed ratio between said two output elements.

6. A vehicle drive system according to claim 1, wherein said engaging means comprises a frictional clutch.

7. A vehicle drive system according to claim 6, wherein said control unit is adapted to place said frictional clutch in a partially engaged state.

* * * * *